April 26, 1949.                L. CRANBERG                 2,468,042
                           OPTICAL RANGING DEVICE
Filed Nov. 26, 1945                                      2 Sheets-Sheet 1
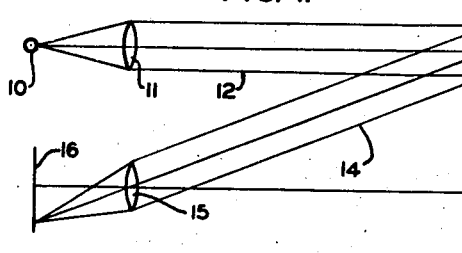
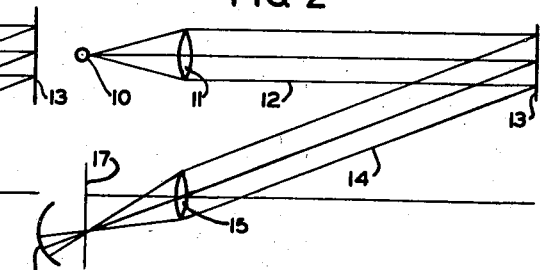
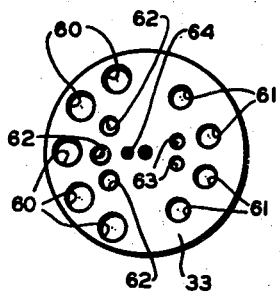
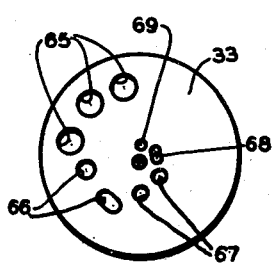
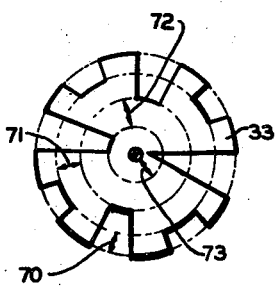
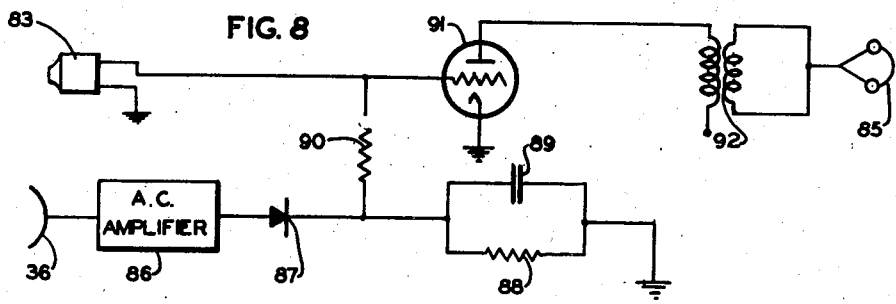
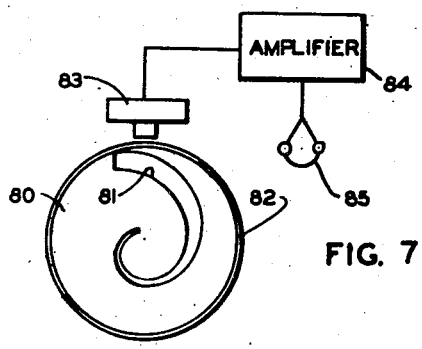
*INVENTOR.*
LAWRENCE CRANBERG
BY
William D. Hall
Attorney.

INVENTOR.
LAWRENCE CRANBERG

Patented Apr. 26, 1949

2,468,042

UNITED STATES PATENT OFFICE 2,468,042

OPTICAL RANGING DEVICE

Lawrence Cranberg, Asbury Park, N. J.

Application November 26, 1945, Serial No. 630,967

12 Claims. (Cl. 177—352)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to optical ranging devices and is particularly directed to an arrangement for providing a sensory indication of range for guidance of the blind.

One of the objects of this invention is to provide a means whereby the distance from an operator to nearby objects is indicated by an auditory signal.

Another object is to provide such a means which is accurate at all ranges and which permits use at close range.

A further object is to provide a ranging device which is compact and light in weight as well as economical in power.

There are generally two types of devices utilizing optical principles which may be used for providing information to a blind person: those which depend upon pattern recognition and correspond essentially to monocular vision, and those which provide range information.

The present invention is based on ranging type devices and operates on the triangulation principle. Generally stated, the application of range finder principles to instruments for guidance of the blind necessitates the projection of modulated or pulsed light onto the object whose range is to be determined, receiving through some coding or scanning means, the light reflected by the object, and making some interpretation of the characteristics of the reflected light which will be in a form that is recognizable by a sense other than sight.

In the present invention I prefer to utilize an auditory signal for simplicity, and a tactile indicator such as a vibrator or buzzer in instances where the user's hearing is impaired. The light projecting system preferably constitutes one arm of the range finder so that only two optical systems are required: a light source and projection lens in the transmitting side of the range finder, and an objective lens and photoelectric cell for the receiving side of the range finder. The base of the range finder is, of course, the separation of the axes of the two lenses.

The invention is fully described and explained in the specification and in the accompanying drawings in which:

Figure 1 illustrates schematically the basic triangulation ranging principle;

Figure 2 illustrates schematically a triangulation ranging system using a simple coding disc in the receiver;

Figure 4 shows one form of coding disc;

Figure 5 shows another form of coding disc;

Figure 6 shows still another form of coding disc;

Figure 7 shows a coding disc and pickup arrangement utilizing a sound track such as a magnetic wire or tape;

Figure 8 shows schematically the arrangement of elements in a system using the coding disc of Figure 7;

Figure 9 shows a tactile indicator.

Figure 3:
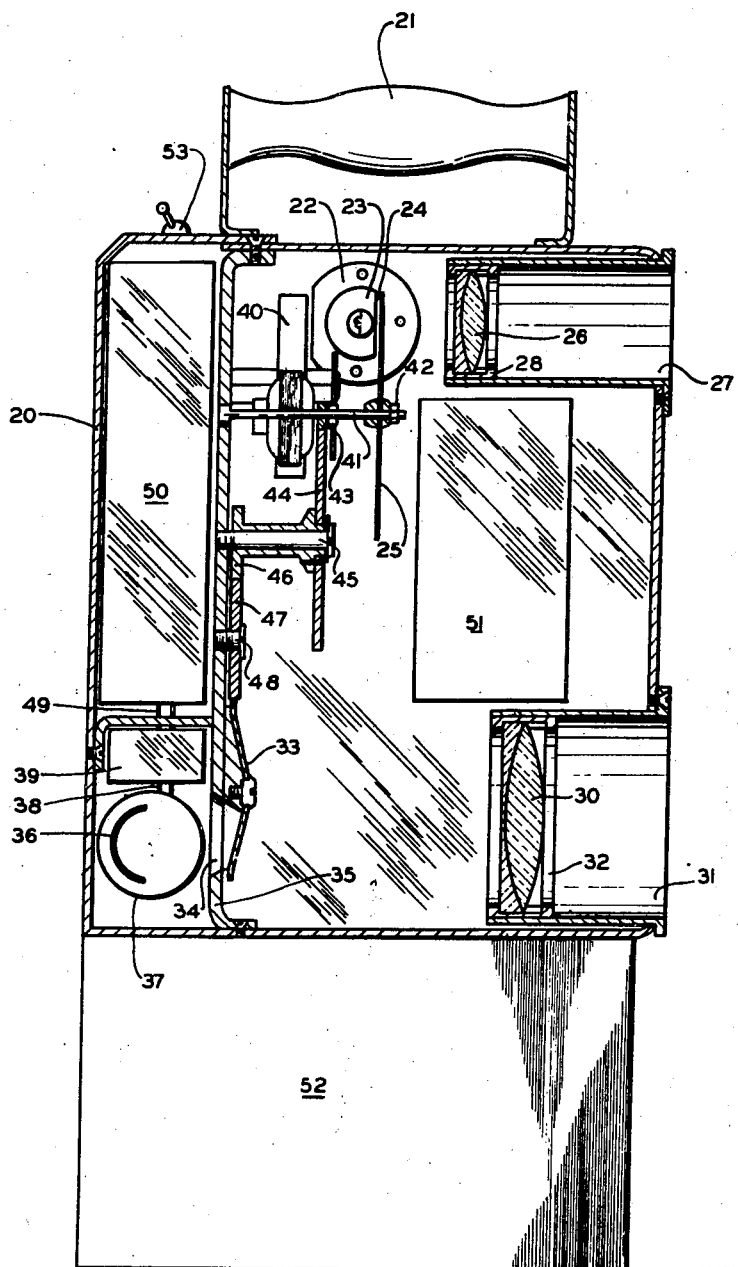
Figure 3 shows in vertical section a ranging instrument including all its components in a practical arrangement.

In Figure 1, which illustrates diagrammatically the basic principle involved, light from the light source 10 is projected by a transmitter lens 11 as a substantially parallel or collimated beam 12. Surface 13 whose range is to be determined reflects the incident light, which reflected light, 14, is received by lens 15. Lens 15 forms an image of the illuminated area in its focal plane 16. This image will be formed lower in the plane shown in the figure the closer the intercepting surface, and higher with more distant intercepting surfaces in accordance with the basic principles of optics.

In Figure 2 the light source 10 cooperates with the projection lens 11 to produce a collimated beam of light 12 similar to that in Figure 1. Light 14 reflected from an intercepting object 13 is received by lens 15 and is directed through a rotating coding disc 17 to a photoelectric cell 18. By providing the coding disc with a series of apertures which vary in number or character with the distance from the axis, there is produced in the photoelectric cell a signal which varies in frequency or other characteristics with the distance from the axis of the disc at which the entering light strikes. Inasmuch as this distance is a function of the distance of the intercepting object as shown in Figure 1, a relationship is established whereby the character of the signal is an indication of range. While this signal may be converted into several forms which would permit interpretation, the form to be considered here in detail will be the auditory. By amplifying the received signal and applying it to headphones or to some similar auditory instrument such as a hearing aid earpiece, a convenient and practical arrangement results.

In Figure 3 a practical arrangement for the purpose is illustrated. A casing 20 provided with suitable handle means 21 contains a lamp housing 22 which covers a small concentrated light source such as a flash light lamp 23. The light passes through an opening 24 in the lamp housing and is interrupted by a rotating, motor driven chopper disc 25 to provide a pulsating light source having a frequency of the order of 500 cycles per second. The light is received by projection lens 26 and projected as a substantially parallel beam of light. Lens 26 may be a cemented doublet as shown or may, in the interests of economy and lightness of construction, be constructed of plastic material with spherical or aspherical surfaces. Lens 26 preferably is mounted in a tube 27 and held in retaining cell or ring 28. The projected beam of light is reflected by an intercepting object. The reflected light is received by lens 30 which is mounted in tube 31 by means of a cell or ring 32. Tube 31 may be internally threaded and painted a dull black to avoid objectionable reflections. The received light passes through apertures (not shown) in coding disc 33 and through light slot 34 in wall 35. The light is received on the photosensitive surface 36 of a photoelectric cell 37. Cell 37 is connected through wires 38 to a preamplifier 39. A motor 40, preferably of the permanent magnet field type to conserve power, is mounted on wall 35 and has its shaft 41 projecting toward the center of the casing as shown. Disc 25 is suitably attached to the outermost end of the shaft and is fastened thereto by lock nut 42. A gear 43 connected to the shaft meshes with gear 44 which is arranged for free rotation on shaft 45 and which in turn carries gear 46. Gear 46 engages gear 47 which is rotatably mounted on stub 48 and which engages teeth on the periphery of coding disc 33. The speed reducing action of gears 43, 44, 46, and 47, is such that coding disc 33 rotates at the speed of the order of one revolution per second.

The output of cell 37 passes through preamplifier 39 through wires 49 to a second amplifier 50 which may be, for example, the type of amplifier ordinarily used in hearing aids. The two amplifiers together are designed for reasonably sharp tuning at 500 cycles per second. A case 51 carries B batteries to provide plate voltage for the preamplifier and photocell. A larger battery compartment 52, preferably carried beneath the main housing, encloses batteries to provide power for the motor and the lamp. A suitable switch 53 is incorporated in the battery circuits to permit convenient control. Amplifier 50 may include suitable gain control means for regulating the intensity of the signal supplied by the hearing aid amplifier to a hearing aid earpiece (not shown) to be worn by the user.

In operation, switch 53 is closed and current from batteries 51 and 52 is supplied to lamp 23, motor 40, and the amplifiers. Disc 25 rotates, interrupting the light passing from the lamp to lens 26 at a rate of about 500 times per second to provide modulation in a suitable audio frequency range. This modulated light is received by an intercepting object which may be located at some distance from the range finder, i. e. from 1 foot to 40 feet or more. The modulated light reflected from the object is picked up by lens 30 and focused on the apertures in coding disc 33 and through slot 34 illuminates the photosensitive surface 36 of the cell. Depending upon the distance of the intercepting object from the range finder, the image of the modulated spot of light will fall at varying distances from the axis of the receiving lens as shown schematically in Figure 1.

It is desirable to maintain the modulated tone at about 500 to 1,000 cycles per second for two reasons: firstly the 500 to 1,000 cycle tone range is readily distinguished from interfering signals such as the 120 cycle tone picked up from 60 cycle electric lighting, most of which is eliminated in the sharp tuning of the amplifier, and secondly the large spread between the tone and the basic signal due to the coding disc permits attenuation of the undesirable background signal due to ambient light passing through all the apertures in the coding disc.

The coding disc may assume various forms as shown in Figures 4, 5, and 6 and, depending on the range of the object, will permit passage of light through apertures at a particular radius.

As shown in Figure 4 the coding disc may include a series of apertures 60, 61, 62, 63, and 64. Apertures 60 are the largest in diameter and aperture 64 is the smallest because of their different linear velocities. All of apertures 60 are spaced apart a distance equal to their radius and are on an arc having the longest radius. Apertures 61 of the next series are somewhat smaller in diameter and are located closer to the center of the coding disc. Apertures 62, 63, and 64 are progressively smaller in diameter and are located on correspondingly smaller radii. The apertures are so arranged that there is substantially no overlapping in the annular zones. Thus, the modulated light reflected by a close object will pass through apertures 60 and indicate to the user through the earphones a signal of five dots. Increasingly further objects will cause the received spot of light to fall higher and higher on the coding disc resulting in signals of four, three, two or one dot. The user is thus provided, in the example of this particular type of disc, with five basic code signals. For distances which correspond to the space between two adjacent radii on the coding disc the observer receives a mixed signal consisting of the two basic signals thus providing four additional judgements in distance. Depending upon the amount of overlapping of the two received signals, the operator may judge eight additional distances, making a total of seventeen distances possible with a disc having five basic code signals. It is possible, naturally, to increase the number of sets of signals that a disc may carry depending on the ranges it is desired to cover.

In the disc of Figure 5 a dot-dash code is employed, the three dots 65 being placed at the maximum radius, the dot and dash 66 at the next smaller radius; and the two dots 67, the dash 68, and the single dot 69 at progressively smaller radii to provide a signal which is the equivalent of that resulting with the disc of Figure 4. As in Figure 4 the dots are separated by a space equal to their diameter and there is no zonal overlapping.

A third modification of coding disc is shown in Figure 6 in which the disc is divided into a plurality of sectors, each alternate sector being provided with cut-out portions which permit eight, four, two, or one signal impulses per revolution of the disc to be heard or felt in zones 70, 71, 72, and 73 respectively depending upon the radius at which the received light strikes the coding disc. This form is advantageous in that the signals are presented at a reasonably high rate, especially at disc speeds of the order of four or five revolutions per second. It is possible to determine range almost instantaneously from the received signal inasmuch as half a revolution or less of the coding disc in an elapsed time of a fraction of a second supplies the necessary information. This form is also advantageous in that the signal changes are by octaves and also that there is alternate attenuation and reenforcement of the signal when the received light overlaps two zones.

It is entirely practical to construct the coding disc of some transparent medium such as a resin or plastic and to mask portions of the disc to provide any one of many possible coding systems. This reduces weight by eliminating the use of metal and avoids the necessity of drilling holes, etc.

Inasmuch as it is undesirable to occupy the user's sense of hearing with the range finder to the exclusion of other sounds the present invention lends itself well to the presentation of tactile signals due to the fact that the impulses are of a very low frequency. Rotation of the coding discs of Figures 3 and 4 at the usual rate of approximately one revolution per second permits the user to recognize the one to five impulses per second readily through a magnetic device arranged to touch, for example, the users fingers while using the range finder. Such a device, shown in Figure 9, comprises a small solenoid within a housing 95 through which projects a member 96 moved by the solenoid, not shown. A tactile indicator of this type may be connected in place of the earphone and held in the hand or may be set permanently in the handle of the range finder with the vibrating member projecting outwardly into contact with the hand of the user while the range finder is being carried.

In the modification of Figure 7 a disc 80 is provided with a continuous open spiral slot 81 and carries around its periphery a magnetic recording tape or wire 82 on which has been impressed an audio-frequency signal such as varying pitch, human speech, etc. A pick-up head 83 is arranged adjacent to wire 82 and is connected to an amplifier 84 from which the signal is supplied to headphones 85. In the operation of this modification light entering the slot 81 controls operation of amplifier 84 so that a particular tone is heard for a particular distance. For example, tape 82 may be arranged around the periphery of the disc so that the portion of highest pitch is adjacent the pick-up when light is entering the spiral slot at a point corresponding to the closest workable distance of the range finder. The tone on the tape may be graduated along its length so that the lowest pitch corresponds to the position of the slot at the furthest workable distance of the finder. With such an arrangement a stepless continuous variable indication of range may be obtained.

The schematic diagram for this modification is shown in Figure 8 in which the electronic circuit is so arranged that the output of the phototube amplifier 86 acts as a volume control on the signal received from the pick-up head. Thus, when no signal is being picked up by the phototube through the spiral scanner no signal will be heard from the magnetic tape and in general the level of signal picked up from the tape will be proportional to the light received. The control voltage circuit may be adjusted for quick response and relatively long-recovery time, thereby increasing the duration of the characteristic signal. Normally the vacuum tube 91 is biased to cutoff, the received signal acting through rectifier 87 and resistor 90 to energize tube 91. The signal is supplied to phones 85 through transformer 92. A resistance-capacitance network 88—89 connects to ground as shown. The phototube used may be of the glass envelope type such as the RCA921 or equivalent.

Under certain circumstances the light projected by the range finder may be objectionable and it is feasible to use infrared filters which eliminate much of the visible radiation without appreciable loss of signal strength inasmuch as phototubes of the type described are quite sensitive to the red and infrared end of the spectrum and because much of the radiant energy from the tungsten light source is also concentrated near the infrared end.

It is to be understood that the particular elements and arrangement of parts disclosed are shown for purposes of illustration only, many modifications being possible within the scope and extent of the appended claims.

I claim:

1. An optical ranging system comprising means to project a collimated beam of light toward an object, focusing means spaced from said first-named means for receiving light reflected by said object and for forming an image upon the focal plane thereof, said image being spaced from the focal axis of said focusing means by an amount proportional to the distance of said object, and signalling means for indicating the distance of said object, said signalling means including light translating means having a continuously rotating element for sequentially scanning elemental areas in said focal plane to determine the distance of said image from said focal axis.

2. An optical ranging system as set forth in claim 1, wherein said rotating element is an opaque disc having light transmitting areas situated along a spiral path originating at said focal axis.

3. An optical ranging system as set forth in claim 1, wherein said rotating element is an opaque disc having a spiral light transmitting area originating at said focal axis.

4. An optical ranging system as set forth in claim 1, wherein said rotating element is an opaque disc having a spiral light transmitting area originating at said focal axis, said disc having signal producing means thereon to identify the portion of said spiral area registering with said image at each revolution of said disc.

5. An optical ranging system as set forth in claim 1, wherein said rotating element is an opaque disc having a spiral light transmitting area originating at said focal axis, the periphery of said disc being magnetic and having recorded thereon signal producing data to identify the portion of said spiral area registering with said image at each revolution of said disc.

6. In an optical range finder, a source of illumination, focusing means for projecting the illumination toward an object whose range is to be determined, a single focusing means for receiving illumination reflected by the object and focusing said illumination at different parts of an area depending on the distance of the reflecting object, a scanner for receiving illumination from said single focusing means and for modulating said illumination variably depending on the part of said area on which said illumination is focused, photoelectric cell means responsive to all variably-modulated illumination passing said scanner, and means energized by the output of said photoelectric cell means to provide a signal indicating the range of said object.

7. A system as set forth in claim 6, wherein said last-named means includes an audible signal.

8. A system as set forth in claim 6, wherein said last-named means includes a tactile signal.

9. A system as set forth in claim 6, wherein said scanner comprises an opaque disc provided with light transmitting areas of varying size at different radial distances.

10. A system as set forth in claim 6, wherein said scanner comprises an opaque disc provided with light transmitting areas of varying size and configuration at different radial distances.

11. A system as set forth in claim 6, wherein said scanner comprises an opaque disc provided with a continuous spiral slot.

12. A system as set forth in claim 6, wherein said scanner variably interrupts said illumination.

LAWRENCE CRANBERG.

REFERENCES CITED

The following references are of record in the file of this patent:

UNITED STATES PATENTS

| Number | Name | Date |
|---|---|---|
| 1,954,204 | Hayes | Apr. 10, 1934 |
| 2,081,134 | Buckley | May 25, 1937 |
| 2,216,716 | Withem | Oct. 1, 1940 |
| 2,237,193 | Mobsby | Apr. 1, 1941 |
| 2,297,534 | Brulin | Set. 29, 1942 |
| 2,350,820 | Rettinger | June 6, 1944 |
| 2,365,580 | Murcek | Dec. 19, 1944 |
| 2,379,496 | Savnier | July 3, 1945 |

FOREIGN PATENTS

| Number | Country | Date |
|---|---|---|
| 14,678 | Great Britain | Oct. 18, 1915 |